United States Patent [19]

Wagener

[11] Patent Number: 5,008,494

[45] Date of Patent: Apr. 16, 1991

[54] BUSBAR SYSTEM WITH HOLDERS AND BUSBAR SECTIONS

[76] Inventor: Hans Wagener, Rittershäuser Str. 14, 6344 Dietzhölztal-Rittershausen, Fed. Rep. of Germany

[21] Appl. No.: 332,708

[22] Filed: Apr. 3, 1989

[30] Foreign Application Priority Data

Apr. 6, 1988 [DE] Fed. Rep. of Germany ....... 3811457

[51] Int. Cl.$^5$ ............................................. H02G 5/00
[52] U.S. Cl. ................................. 174/68.2; 174/88 B
[58] Field of Search ................... 174/16.2, 68.2, 70 B, 174/71 R, 71 B, 72 R, 72 B, 72 C, 84 S, 88 B, 88 S, 99 B, 99 E, 100, 129 B, 133 B, 149 B, 171; 361/341, 342, 353, 355, 361, 363, 376, 378; 439/110, 113, 114, 115, 119, 120, 207, 210, 212, 213, 214

[56] References Cited

U.S. PATENT DOCUMENTS

| | | | |
|---|---|---|---|
| 2,673,967 | 3/1954 | Hedgecock | 439/120 |
| 2,979,686 | 4/1961 | Longmire | 174/88 B X |
| 3,280,245 | 10/1966 | Rodeseike | 174/171 X |
| 4,030,794 | 6/1977 | Rozenboom et al. | 439/213 |

FOREIGN PATENT DOCUMENTS

| | | |
|---|---|---|
| 7435327 | 1/1975 | Fed. Rep. of Germany . |
| 3143518 | 5/1983 | Fed. Rep. of Germany ..... 174/68.2 |
| 3616662 | 11/1987 | Fed. Rep. of Germany .... 174/88 B |
| 3642517 | 3/1988 | Fed. Rep. of Germany ...... 439/120 |
| 3642518 | 3/1988 | Fed. Rep. of Germany ...... 439/119 |
| 394199 | 6/1933 | United Kingdom ................ 439/110 |
| 594896 | 11/1947 | United Kingdom ............ 174/129 B |

Primary Examiner—Laramie E. Askin
Attorney, Agent, or Firm—Malcolm B. Wittenberg

[57] ABSTRACT

A busbar system with holders, the tops of the holders having a number of receptacles for busbar sections running at a specific interval and parallel with respect to one another, the busbar sections being fixed in position in these receptacles. The busbar system can be easily extended using prefabricated units with the busbar sections being completely covered on the side facing the mounting surface. The holders are designed as rectangular carrier plates aligned with the longitudinal sides of the plates parallel to the busbar sections. The busbar sections terminate flush with the narrow sides of the carrier plates. On the narrow sides of the carrier plates, the facing end sections of the receptacles and/or the busbar sections accommodate one-half of connecting elements aligned in the longitudinal direction of the busbar sections. The connecting elements can be connected so as to be electrically conducting when the holders are connected in a row with the ends of busbar sections abutting.

13 Claims, 2 Drawing Sheets

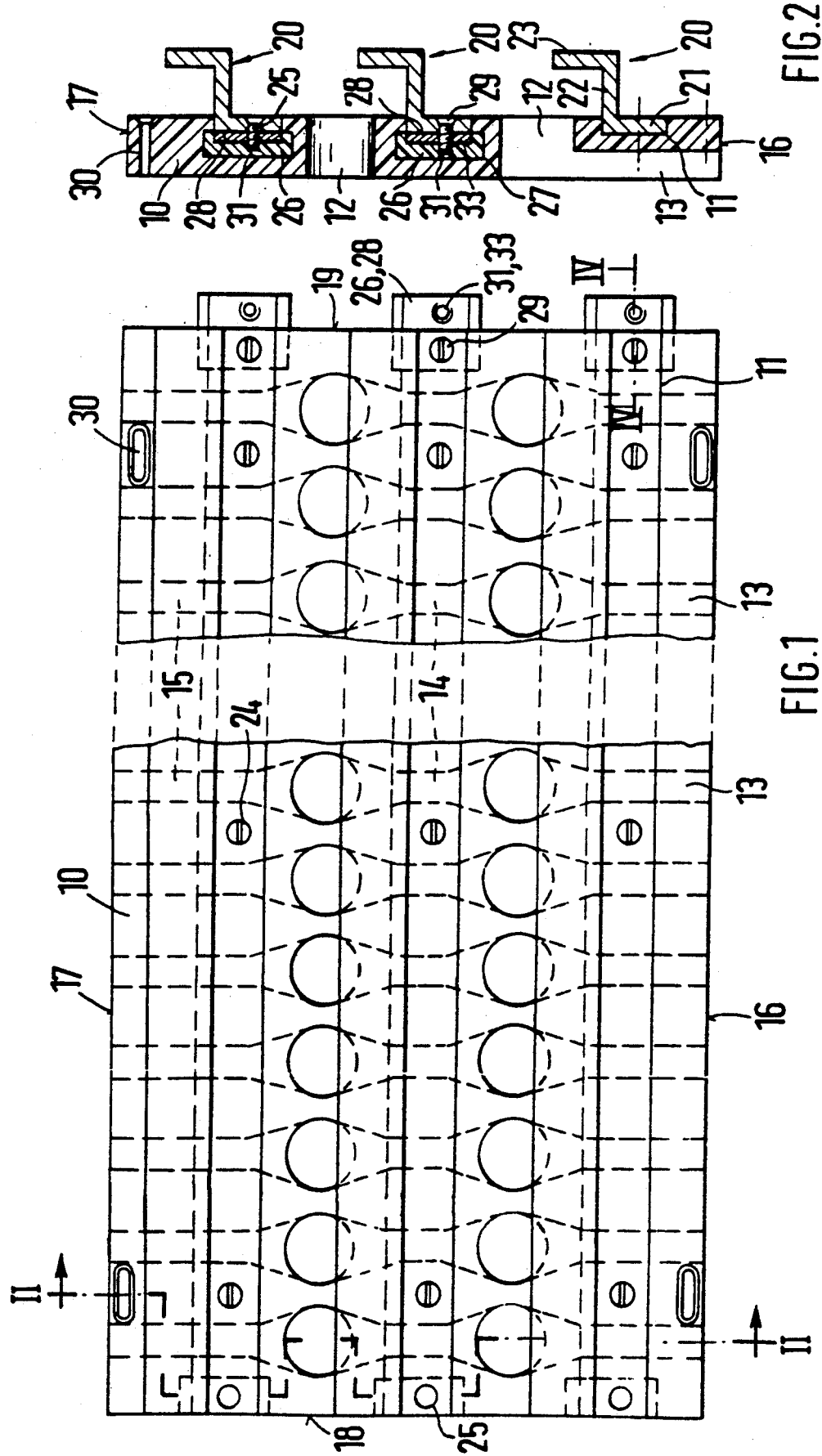

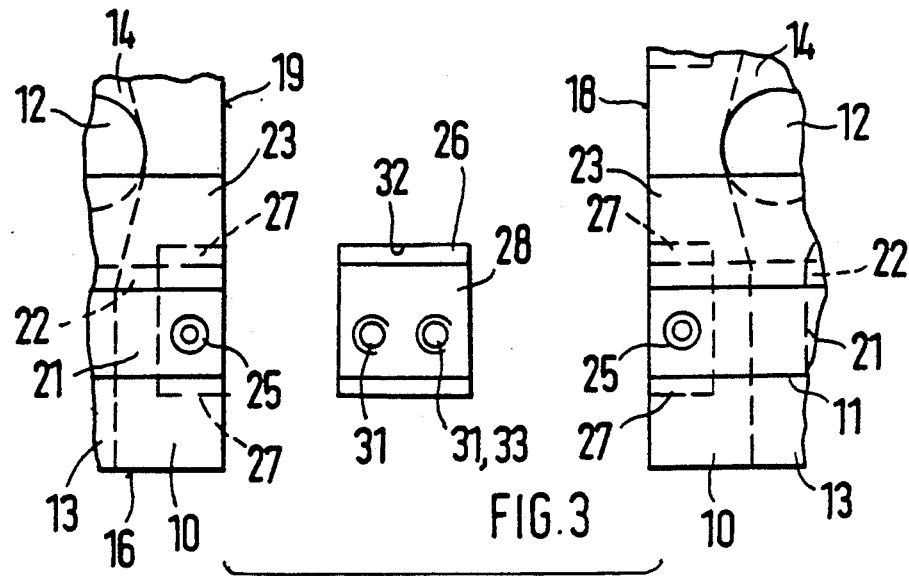
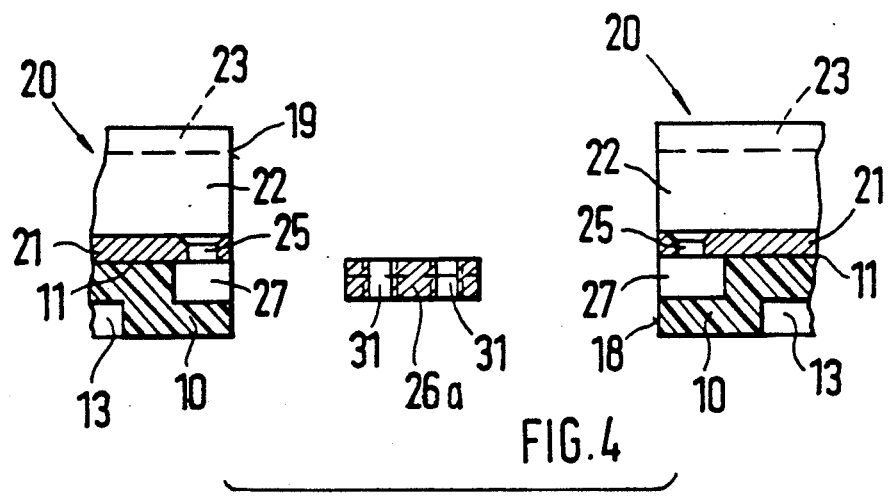
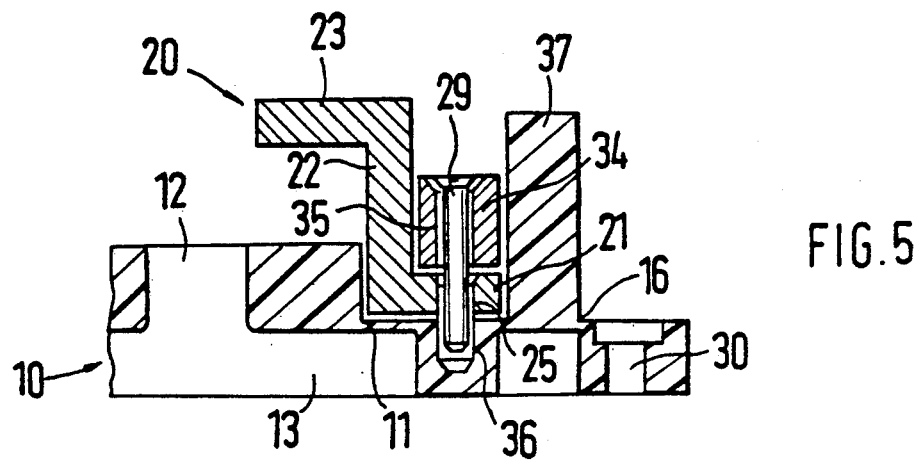

BUSBAR SYSTEM WITH HOLDERS AND BUSBAR SECTIONS

The invention involves a busbar system with holders, the tops of said holders having a number of receptacles for busbar sections running at regular intervals and parallel to one another, said sections being positioned in these receptacles.

A holder for this type of busbar system is disclosed in German Pat. No. 31 43 518 (corresponding U.S. Pat. No. 4,457,481). In this patent, the holder is cuboid and narrow, extends only partially along the length of the busbar sections and covers these sections. As a result of this, no electrical equipment may be connected to the busbar sections in the area of the holders. In addition, joining the busbar sections to extend the busbar system is not possible such that, even in the area of the joints of the busbar sections, electrical equipment can be connected to the busbar sections. The busbar sections are completely open between the holders, a situation that increases the danger of short circuits in busbar systems with wired electrical equipment.

The object of this invention is to design a busbar system of the type mentioned above such that said system can easily be extended and such that the busbar sections are completely covered on the side facing the mounting surface.

This object is achieved by the invention due to the fact that the holders are designed as rectangular carrier plates, the longitudinal sides of said plates being aligned in parallel with the busbar sections; that the busbar sections abut the narrow sides of the carrier plate; that, on the narrow sides of the carrier plate, the facing end sections of the receptacles and/or the busbar sections accommodate one-half of connecting elements aligned in the longitudinal direction of the busbar sections; and that said connecting elements can be connected so as to be electrically conducting when the holders are joined together with the ends of the busbar sections abutting.

The plate-shaped holders form units with the busbar sections fixed in position in the receptacles of said holders; said units may be joined with simple connecting elements with the connecting elements performing the electrical connection of the busbar sections via the units and the carrier plates providing complete insulation and covering the busbar sections on the side facing the mounting surface so that the danger of short circuits between busbar sections is reduced to a very great degree.

If the receptacles for the busbar sections are designed as slots and recesses for the plate-shaped connecting elements are provided in the end sections of the receptacles in the slot bottoms, then the abutting carrier plates accommodate the plate-shaped connecting elements such that said elements cannot be observed. In this respect, a seamless joining of the holders is provided so that the width, depth and height of the recesses are matched to the width, one-half the length and the thickness of the plate-shaped connecting elements.

Electrical connection of the abutting busbar sections is achieved simply in that the sections are provided with a mounting hole for a mounting screw above the recesses and that said mounting screws can be screwed into threaded holes of the connecting elements.

For fixing the busbar sections in position in the receptacles of the carrier plate, one implementation provides that the busbar sections be inserted with one mounting arm into the receptacles of the carrier plate and connected to said plate by means of screws; in so doing screws are spaced at equal distances with respect to one another in the longitudinal direction of the busbar sections and aligned one above the other perpendicularly to the busbar sections. In this implementation, the connecting elements consist of electrically conducting materials. In this case, provisions have been made for a low contact resistance so that the width of the recesses corresponds to the width of the mounting arm of the busbar sections and of the connecting elements.

For insulation reasons, another implementation may also provide that the connecting elements be composed of an insulating support and a contact plate; in this implementation, the threaded holes are provided in the insulating supports and the contact plates are provided with aligned through-holes. In this implementation, the insulating supports cover the side walls of the contact plates, said side walls running parallel to the busbar sections. The contact plates make contact with the bottoms of the busbar sections.

The electrical connection of the abutting busbar sections of holders connected in a row can, in an additional implementation, also be designed so that the connecting elements are arranged above the mounting arms of the busbar sections and are or connected to the mounting arms so as to be electrically conducting. In this implementation, the problem of bolting is solved such that the mounting arms in the end of sections of the receptacles are equipped with mounting holes for a mounting screw and that the mounting screws are inserted into through-holes of the connecting elements, into the mounting holes of the mounting arms of the busbar sections, and can be screwed into the threaded holes of the carrier plate.

So that electrical equipment such as the equipment described in German Pat. No. 36 42 517 (corresponding U.S. Pat. No. 4,874,321) and German Pat. No. 36 42 518 (corresponding U.S. Pat. No. 4,832,626), can be connected to the busbar sections over the entire length of connected busbar sections of holders connected into rows, the preferable design is such that the busbar sections are in the form of a Z, in which case one cross arm serves as the mounting arm and the other cross arm acts as the clamping arm running at a distance from and parallel to the top of the carrier plate.

Protection of the connecting and interconnecting cables routed to the electrical equipment mounted on the busbar sections is achieved in an additional implementation in that the carrier plates, at least between adjacent busbar sections, are equipped with rows of openings that feed into cable ducts, said ducts being located in the bottoms of the carrier plates and connecting the openings aligned perpendicularly to the busbar sections to one another and with the longitudinal sides of the carrier plates.

The invention is described in more detail using one of the implementation examples shown in the drawings:

FIG. 1 is a plan view of a holder with inserted busbar sections.

FIG. 2 is a cross-sectional view through the holder along line II—II of FIG. 1.

FIG 3 is an enlarged partial plan view in which the electrical connection of the holders to be used to join the busbar sections together by means of a two-part connecting element can be seen.

FIG. 4 is an enlarged partial sectional view in which the electrical connection of the holders to be used to join the busbar sections by means of a one-part connecting element can be seen.

FIG. 5 is an enlarged partial sectional view showing an alternate manner of attaching the busbar sections to the holder.

As shown in the implementation example of FIGS. 1 and 2, the holder is designed as a rectangular carrier plate 10 made of insulating material and has, in its top, three slot-shaped receptacles 11 aligned along the longitudinal direction; said receptacles are located perpendicularly to the busbar sections 20 inserted into said receptacles, and are at regular intervals with respect to one another.

The cross-section of each busbar section 20 is shaped like a Z in which cross arm 21 acting as the mounting arm 21, is inserted flush into the receptacle 11 and fixed in position in said receptacle by means of the screws 24. The screws 24 are arranged also at uniform intervals in the longitudinal direction of the busbar sections 20 and aligned one above the other perpendicular to said section. The center arms 22 of the busbar sections 20 act as spacer arms which hold the other cross arms 23 of the busbar sections 20 acting as clamping arms to fix the electrical equipment in position at the specified interval and parallel to the top of the carrier plate 10. The busbar sections 20 extend over the entire length of the carrier plate 10, run parallel to the longitudinal sides 16 and 17 of said plate, and end flush with the narrow sides 18 and 19 of the carrier plate 10 that run perpendicularly to the busbar sections 20. The carrier plate 10 insulates and covers completely the busbar sections 20 on the side facing the mounting surface. Perpendicularly running ducts 13, 14 and 15 are located in the bottom of the carrier plate 10, said ducts extending over a portion of the thickness of the carrier plate 10. Between adjacent busbar sections 20, rows of openings 12 designed as holes are located in the carrier plate 10. The openings 12 are positioned at regular intervals in the longitudinal direction of the busbar sections 20 and, in the rows, the openings 12 are aligned one above the other pependicularly to the busbar sections 20. The ducts 13 connect the longitudinal side 16 to the facing row of openings 12 while the ducts 15 connect the longitudinal side 17 to the facing row of holes 12. The ducts 14 connect the openings 12 of both rows. In this manner, the ducts 13, 14 and 15 serve as cable ducts in which connecting and interconnecting cables may be routed to the electrical equipment fixed in position on the clamping arms 23 of the busbar sections 20 in the specified separation of the openings 12 in the rows protected by the carrier plate 10. The carrier plate 10 has mounting holes 30 for mounting screws near the edges of the longitudinal sides 16 and 17.

The carrier plate 10 and the busbar sections 20 inserted into the receptacles 11 form a prefabricated unit. Several of this type of unit can be connected to one another in a row to form a busbar system. In doing so, the abutting ends of the busbar sections 20 must be connected to one another so as to be electrically conducting. In this case, busbar sections 20 having the same cross-sectional area are used in the carrier plates. If the clamping arms 23 of all the busbar sections 20 face the longitudinal side 17 of the carrier plate 10, the clamping arms 23 then have the same average spacing as the receptacles 11 in the carrier plate 10 which is matched to the contact brackets or spring contacts of the mounted electrical equipment.

Recesses 27 are located in the slot bottoms of the slot-shaped receptacles 11 in the end sections facing the narrow sides 18 and 19 of the carrier plate 10, said recesses accommodating one-half of a single-piece plate-shaped connecting element 26a, as shown by the cutaway drawing of FIG. 4. The width, depth and height of these recesses 27 correspond to the width, one-half the length and the thickness of the electrically conducting connecting elements 26a. Above the recesses 27, the busbar sections 20 have mounting holes 25 for mounting screws 29 that are screwed into threaded holes 31 of the connecting elements 26a. In this manner, the carrier plates 10 can be connected to one another without seams in a row and the connecting elements 26 provide electrically conducting connections for the busbar sections 20 beneath the mounting arms 21. In this case, the complete width of the mounting arms 21 is utilized as the contact surface if the recesses 27 and the connecting elements 26a extend over the entire width of the mounting arms 21 of the busbar sections 20.

As the view of FIG. 3 shows, connection can also be performed by means of two-part connecting elements. As can be seen in FIG. 2, the contact plates 28, made of conducting material, extend over the entire width of the mounting arms 21 of the busbar sections 20 while the side arms 32 (FIG. 3) of the U-shaped insulating plates 26 cover the longitudinal sides of the contact plates 28 in an insulating manner. The recesses 27 thus have a width that is larger than the width of the mounting arms 21 of the busbar sections 20. The contact plates 28 have through-holes 33 for the mounting screws 29 above the threaded holes 31 of the insulating plates 26, said mounting screws being inserted in the mounting holes 25 of the busbar sections 20.

As shown in FIG. 5, connecting elements 34 can also be arranged over the mounting arms 21 of the busbar sections 20. The receptacles 11 then have the same cross-sectional area over the entire length of the carrier plate 10. The mounting holes 25 in the end sections of the busbar sections 20 accommodate the mounting screws 29 that are first routed via the through-holes 35 of the connecting elements 34 and then screwed into the threaded holes 36 through the holes 25, said threaded holes being located in the carrier plate 10 beneath the holes 25 or which are created when screwing self-tapping mounting screws 29. The connecting elements 34 cover the width of the mounting arms 21 of the busbar sections 20; in this respect, the partitions or end bridges 37 of the carrier plate 10 represent a boundary and provide a high degree of insulation for the busbar sections with respect to one another up to the clamping arms 23.

I claim:

1. A busbar system with holders, the tops of said holders having a number of receptacles, busbar sections spaced at intervals and running parallel and fixed in position in said receptacles, said holders being rectangular carrier plates having narrow sides and longitudinal sides, said longitudinal sides being aligned in parallel with the busbar sections, the busbar sections abutting the narrow sides of the carrier plates, the narrow sides of the carrier plates at the facing end sections of the receptacles accommodating one-half of connecting elements aligned in the longitudinal direction of the busbar sections, said connecting elements being connected so as to conduct electrically and so that the holders are joined together in a row with the ends of the busbar sections abutting, wherein the connecting elements are each composed of an insulating support and a contact plate, and there are threaded holes in the insulating support and aligned through-holes in the contact plate.

2. The busbar system according to claim 1 wherein the receptacles for the busbar sections are shaped like slots, and recesses for the connecting elements are provided in the end sections of the receptacles in the slot bottom.

3. The busbar system according to claim 2 wherein the width, depth and height of the recesses are matched to the width, to one-half the length and to the thickness of the connecting elements, and each connecting element is in the shape of a plate.

4. A busbar system according to claim 1 wherein the busbar sections have mounting arms which are inserted into the receptacles of the carrier plates and are connected to said carrier plates by means of screws, with the screws being located at regular intervals with respect to one another in the longitudinal direction of the busbar sections and being aligned perpendicularly to the busbar sections one above another.

5. The busbar system according to an one of claims 1, 2, 3 and 4 wherein the insulating supports cover the side walls of the contact plates, said side walls running in parallel with the busbar sections.

6. A busbar system with holders, the tops of said holders having a number of receptacles, busbar sections spaced at intervals and running parallel and fixed in position in said receptacles, said holders being rectangular carrier plates having narrow sides and longitudinal sides, said longitudinal sides being aligned in parallel with the busbar sections, the busbar sections abutting the narrow sides of the carrier plates, the narrow sides of the carrier plates at the facing end sections of the receptacles accommodating one-half of connecting element aligned in the longitudinal direction of the busbar sections, said connecting elements being connected so as to conduct electrically and so that the holders are joined together in a row with the ends of the busbar sections abutting, said busbar sections having mounting arms which are inserted into the receptacles of the carrier plates and are connected to said carrier plates by means of screws, with the screws being located at regular intervals with respect to one another in the longitudinal direction of the busbar sections and being aligned perpendicularly to the busbar sections one above another, the busbar sections being in the shape of a Z with one cross arm acting as the mounting arm and the other cross arm acting as a clamping arm and running at a distance from and parallel to the tops of the carrier plates.

7. A busbar system with holders, the tops of said holders having a number of receptacles, busbar sections spaced at intervals and running parallel and fixed in position in said receptacles, said holders being rectangular carrier plates having narrow sides and longitudinal sides, said longitudinal sides being aligned in parallel with the busbar sections, the busbar sections abutting the narrow sides of the carrier plates, the narrow sides of the carrier plates at the facing end sections of the receptacles accommodating one-half of connecting elements aligned in the longitudinal direction of the busbar sections, said connecting elements being connected so as to conduct electrically and so that the holders are joined together in a row with the ends of the busbar sections abutting, and wherein the carrier plates are provided with rows of openings at least between adjacent busbar sections, said openings feeding into cable ducts in the bottoms of the carrier plates, said ducts connecting the openings and being aligned perpendicularly to the busbar sections and to the longitudinal sides of the carrier plates.

8. The busbar system of claim 7 wherein the receptacles for the busbar sections are shaped like slots, and recesses for the connecting elements are provided in the end sections of the receptacles in the slot bottoms.

9. The busbar system of claim 8 wherein the width, depth and height of the recesses are matched to the width, to one-half the length and to the thickness of the connecting elements, and each connecting element is in the shape of a plate.

10. The busbar system of claim 7 wherein the busbar sections have mounting arms which are inserted into the receptacles of the carrier plates and are connected to said carrier plates by means of screws, with the screws being located at regular intervals with respect to one another in the longitudinal direction of the busbar sections and being aligned perpendicularly to the busbar sections one above another.

11. A busbar system with holders, the tops of said holders having a number of receptacles, busbar sections spaced at intervals and running parallel and fixed in position in said receptacles, said holders being rectangular carrier plates having narrow sides and longitudinal sides, said longitudinal sides being aligned in parallel with the busbar sections, the busbar sections abutting the narrow sides of the carrier plates, the narrow sides of the carrier plates at the facing end sections of the receptacles accommodating one-half of connecting elements aligned in the longitudinal direction of the busbar sections, said connecting elements being connected so as to conduct electrically and so that the holders are joined together in a row with the ends of the busbar sections abutting, the busbar sections being in the shape of a Z with one cross arm acting as a mounting arm and the other cross arm acting as a clamping arm and running at a distance from and parallel to the tops of the carrier plates.

12. The busbar system of claim 11 wherein the receptacles for the busbar sections are shaped like slots, and recesses for the connecting elements are provided in the end sections of the receptacles in the slot bottoms.

13. The busbar system of claim 12 wherein the width, depth and height of the recesses are matched to the width, to one-half the length and to the thickness of the connecting elements, and each connecting element is in the shape of a plate.

* * * * *